(No Model.)
D. W. TROY.
AUTOMATIC CUT-OFF MECHANISM FOR WATER PIPES.
No. 585,061. Patented June 22, 1897.
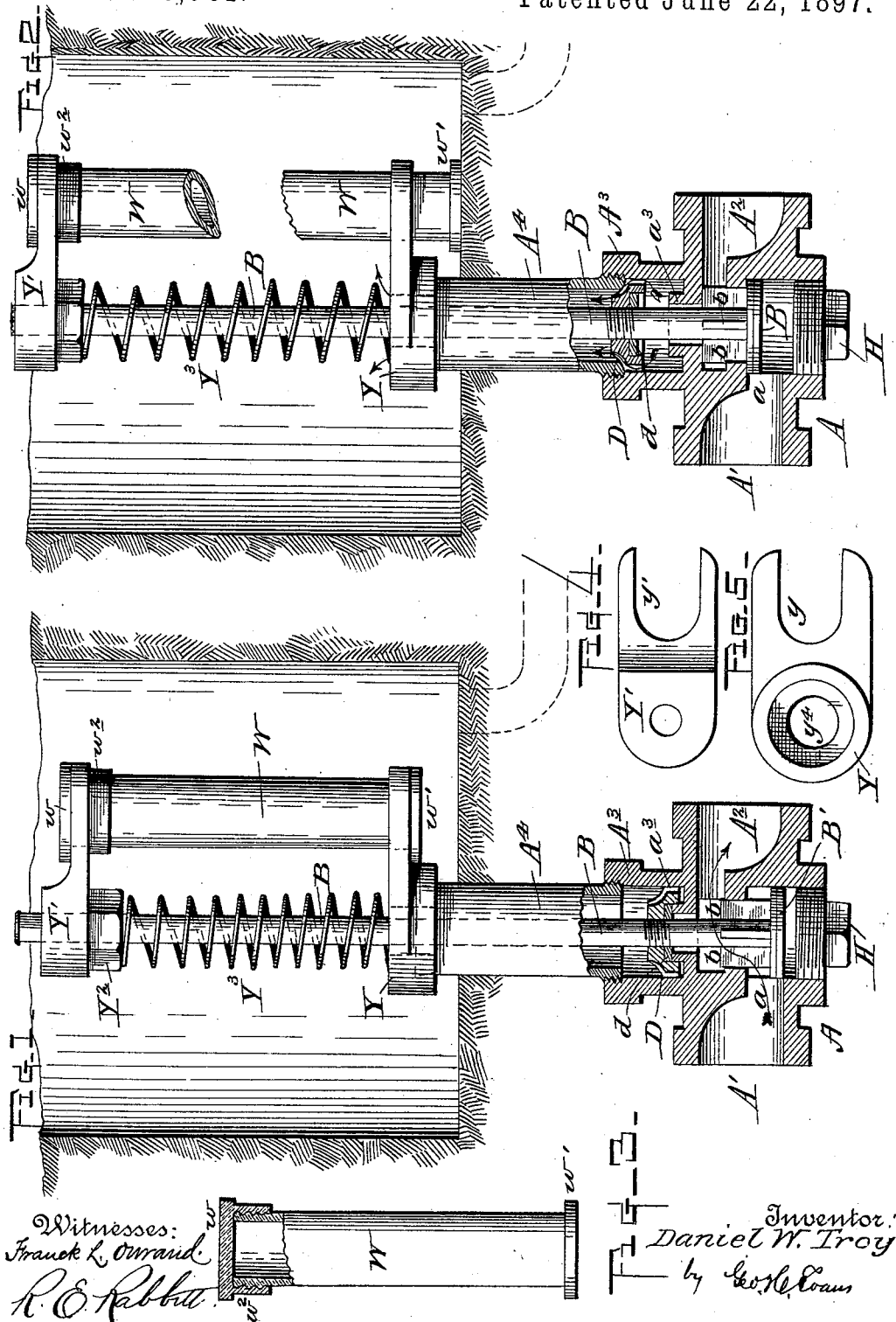
Witnesses:
Franck L. Ourand
R. E. Rabbitt
Inventor:
Daniel W. Troy
by Geo. H. Evans
Attorney

UNITED STATES PATENT OFFICE.

DANIEL W. TROY, OF MONTGOMERY, ALABAMA.

AUTOMATIC CUT-OFF MECHANISM FOR WATER-PIPES.

SPECIFICATION forming part of Letters Patent No. 585,061, dated June 22, 1897.

Application filed February 26, 1897. Serial No. 625,112. (No model.)

*To all whom it may concern:*

Be it known that I, DANIEL W. TROY, a citizen of the United States, residing at Montgomery, in the county of Montgomery and State of Alabama, have invented certain new and useful Improvements in Automatic Cut-Off Mechanism for Water-Pipes, of which the following specification contains a full, clear, and exact description, reference being had to the accompanying drawings, forming part thereof, in which—

Figure 1 is a side elevation of my cut-off mechanism, partly in section, with the supply-valve held in its open position and the waste-valve held closed by the glass tube. Fig. 2 is a similar view showing the glass tube broken and the valves in their opposite positions. Fig. 3 shows one of the glass tubes detached, and Figs. 4 and 5 are detail views of the upper and lower forks or jaws which engage the glass tube.

My invention relates to that class of cut-off mechanisms which are employed to automatically cut off the water from the service-pipe to the house water-pipes when the temperature falls to a certain predetermined point, so as to prevent freezing of the water in the house-pipes.

The object of the invention is to provide a cut-off mechanism which shall be simple and efficient and in which the supply-valve will be normally held open or in position to permit a free flow of water from the service-pipe into the house-pipes and the waste-valve held closed by means of a liquid-containing vessel of glass or other material which will break when its contents freezes and thereby permit the automatic closing of the supply-valve and the automatic opening of the waste-valve.

A further object is to provide for the ready insertion of a new glass or like vessel and to provide a simple valve mechanism not liable to get out of order. For the sake of brevity I will call the said glass or like fracturable vessel a "cartridge."

The invention consists, mainly, in a cut-off mechanism provided with a glass or like liquid-containing cartridge to hold the supply or cut-off valve normally open, said cartridge being fracturable by the freezing of its contents, so as to release the supply-valve and permit it to automatically close.

The invention consists, further, in a cut-off mechanism comprising a valve-casing having a supply and a waste valve and a glass or like liquid-containing cartridge to hold the supply-valve normally open and the waste-valve normally closed, so that when the cartridge is broken by the freezing of its contents it will release the valve mechanism and permit the supply-valve to close and the waste-valve to open.

The invention also consists in the various combinations and construction of parts, as will be hereinafter fully described and claimed.

A is the valve-casing, divided between its inlet and outlet ends $A'$ $A^2$, so as to form the valve-seat $a$, and provided in its upper side with a waste branch $A^3$, into which is screwed the vertical waste-pipe $A^4$. In the bottom of the waste branch $A^3$ is formed the annular valve-seat $a^3$ concentric with valve-seat $a$.

H is a screw-plug closing an opening in the bottom of the casing directly beneath the valve-seat $a$.

B is a valve-rod provided within the inlet side of the casing with a supply or cut-off valve $B'$, to which access may be had by removing plug H, and this valve is normally held open, but may close upwardly against the valve-seat $a$ to prevent the water from flowing through the casing. The valve-rod is provided within the outlet branch $A^3$ with a waste-valve D, which is normally seated on the valve-seat $a^3$, so as to prevent the escape of water at that point. The lower side of this valve D is recessed, and in this recess is fitted a packing-disk $d$, which engages the upper edge of the annular seat $a^3$, as clearly shown in Fig. 1. It will be understood that valve D is of less diameter than the branch $A^3$, so that when unseated the water will be free to flow upwardly around it into the waste-pipe $A^4$.

The upper end of the waste-pipe is provided with a transverse arm Y, provided with a forked outer end $y$, and a similar arm $Y'$ $y'$ is mounted loosely on the upper end of the valve-rod B, where it rests upon an adjusting-nut $Y^2$, adapted to screw up and down on said rod. A spring $Y^3$ encircles the valve-rod B between the forked arms Y Y' and tends, by bearing on the nut $Y^2$, to throw the valve-rod upwardly and thereby seat the supply-valve B' and unseat the waste-valve.

W is the cylindrical glass or like cartridge filled with water or other suitable liquid and having flanged ends $w$ $w'$ to engage the upper and lower sides of the forked arms Y Y' and thereby hold down the upper arm Y', so as to compress the spring $Y^3$. The upper flange $w$ is formed on a screw-cap $w^2$, which closes the cartridge after it has been filled with liquid. After the filled cartridge W has been inserted in the forked arms Y Y' the nut $Y^2$ is turned, so as to force the valve-rod B down and cause the washer or packing $d$ of the waste-valve to seat firmly on the seat $a^3$. When the parts are thus adjusted and as shown in Fig. 1, the water will be free to flow through the valve-casing from the service-pipe to the house-pipes, but if the temperature falls sufficiently to freeze the contents of the cartridge W the cartridge will be thereby broken, whereupon the compressed spring $Y^3$ will expand and force the valve-rod B upwardly and thereby seat the valve B' to cut off the water-supply and also unseat the waste-valve D and permit the water in the house to run to waste through pipe $A^4$ and an opening $y^4$ in the lower forked arm Y. The parts will now occupy the positions shown in Fig. 2.

If desired, the valve B' may be provided with guide-ribs $b$, working in the valve-seat opening.

In practice a set of cartridges will accompany each cut-off mechanism, and it will be seen that a fresh cartridge may be readily slipped into the forked arms after the valve-rod has been forced down to compress the spring.

The above-described mechanism is to be located underground, and that portion from the arm Y up will be inclosed in a small well having sewer communication, just as stop and waste cocks are usually placed, so that the cartridge may be readily placed in position and the waste water find an outlet.

What I claim is—

1. The combination with a valve mechanism, of a frangible liquid-containing valve-controlling cartridge adapted to break when its contents freezes, and by the separation of its parts release the valve mechanism; substantially as described.

2. A cut-off mechanism comprising a cut-off valve and a waste-valve, and a valve-controlling, liquid-containing cartridge of glass or material which will break upon the freezing of its contents, and thereby release said valves; substantially as described.

3. A cut-off mechanism comprising a valve-casing having a supply or cut-off valve and a waste-valve, a valve-stem on which both valves are mounted, an arm mounted on a part of the valve-casing, a second arm thereabove on the valve-rod, a spring compressed between said arms, and a glass or like cartridge connecting the said arms, and when broken releasing the valve-rod; substantially as described.

4. A cut-off mechanism comprising, a valve-casing having a supply or cut-off valve, and a waste-valve, a valve-rod on which both valves are mounted, an arm mounted on the waste branch, a second arm adjustable on the upper end of the valve-rod, an adjusting device on the rod for adjusting said second arm, a spring compressed between the said two arms, and a glass or like cartridge connecting the said two arms and releasing the valve-rod when broken, substantially as set forth.

5. The combination with the valve-casing and the valve mechanism, of a forked arm mounted on said casing, a second forked arm on the upper end of the valve-rod, a spring encircling the valve-rod between said arms, and a glass or like cartridge fitting into the forked arms and having flanged ends engaging said arms and holding the spring compressed; substantially as described.

6. The combination with the valve-casing and the valve mechanism, of a forked arm mounted on said casing, a second forked arm on the upper end of the valve-rod or stem, and a glass or like cartridge having flanged ends engaging said forked arm to hold the spring compressed, said cartridge having a removable cap or stopper on which one of said flanges is formed; substantially as described.

7. In a cut-off mechanism, the glass cartridge having a closed flanged end, and a flanged cap or stopper closing its opposite end, said cartridge being adapted to break when its contents freezes; substantially as described.

8. A cut-off mechanism comprising the valve-casing having a valve-seat between its ends, a waste branch and pipe on its upper side, a valve-seat in the bottom of the said branch; a valve stem or rod extending down through said waste-pipe and valve-seat openings, a normally open cut-off or supply valve on the lower end of the rod to close upwardly against the first-named valve-seat, a waste-valve also on said rod and normally seated on the waste-valve seat, a forked arm on the upper end of the waste-pipe, a second forked arm on the upper end of the valve-rod, a spring compressed between said two arms, and a liquid-containing cartridge connecting said two forked arms until broken by the freezing of its contents; substantially as described.

DANIEL W. TROY.

Witnesses:
W. S. WILKINSON,
PAT. McGAULY.